United States Patent [19]

Ehrig et al.

[11] Patent Number: 4,634,745

[45] Date of Patent: Jan. 6, 1987

[54] TERPOLYMER PRODUCTION

[75] Inventors: Raymond J. Ehrig, Pittsburgh; John J. Godfrey, Murrysville, both of Pa.

[73] Assignee: United States Steel Corporation, Pittsburgh, Pa.

[21] Appl. No.: 840,482

[22] Filed: Mar. 14, 1986

Related U.S. Application Data

[63] Continuation of Ser. No. 718,591, Apr. 1, 1985, abandoned.

[51] Int. Cl.$^4$ .............................................. C08F 10/08
[52] U.S. Cl. .................................... 526/87; 526/348.6
[58] Field of Search .................. 526/65, 66, 87, 348.6

[56] References Cited

U.S. PATENT DOCUMENTS

| | | | |
|---|---|---|---|
| 3,959,409 | 5/1976 | Frese | 526/348.6 |
| 4,161,574 | 7/1979 | Strametz | 526/348.6 |
| 4,291,132 | 9/1981 | Clifford | 526/66 |
| 4,322,514 | 3/1982 | Miyoshi | 526/348.6 |
| 4,367,322 | 1/1983 | Shiga | 526/348.6 |
| 4,368,291 | 1/1983 | Frese | 526/65 |
| 4,404,342 | 9/1983 | Miyoshi | 526/348.6 |
| 4,414,369 | 11/1983 | Kuroda | 526/66 |
| 4,483,971 | 11/1984 | Sato | 526/348.6 |

Primary Examiner—Paul R. Michl
Attorney, Agent, or Firm—William L. Krayer

[57] ABSTRACT

Terpolymers comprising propylene and small amounts of ethylene and butene-1 are made in a two-stage process wherein a relatively high melting random terpolymer is made in a first stage and a relatively low-melting random terpolymer incorporating a higher concentration of ethylene, is made in a second stage so that it is dispersed in the product of the first stage. The two process stages may be operated in a single batch reactor or two continuous reactors in series.

6 Claims, No Drawings

TERPOLYMER PRODUCTION

This is a continuation, of application Ser. No. 718,591, filed Apr. 1, 1985, now abandoned.

BACKGROUND OF THE INVENTION

Terpolymers comprising 90% or more propylene having a DSC melting point lower than 140°–145° C. cannot be prepared in hexane slurry at 60° C. because the polymer particles swell by absorbing the hexane diluent, become very sticky, and thereby cause agglomeration and reactor fouling. While the use of 1-butene as a termonomer along with small amounts of ethylene is not new, its advantage over ethylene of not increasing the solubility of the polymer as much as ethylene has not been fully utilized in the past because a satisfactory method of manufacturing the polymer has not been conceived to take advantage of the unique contributions of 1-butene while also benefiting from the use of ethylene to modify a basically polypropylene product.

In the past, numerous combinations of monomers, principally ethylene and propylene, have been introduced into the same or different reactors with or without the presence of a chain terminator such as hydrogen between the stages. See, for example, U.S. Pat. Nos. Davison et al 2,839,515, Edmonds, Jr. 3,970,719, Cox 3,264,184, Short 3,318,976, Kontos 3,378,606, Hassell 3,378,608, Hagemeyer, Jr. et al 3,529,037, Gobran et al 3,649,579, Koga et al 3,974,236, and Shiga et al 4,254,237. Many such processes have as their objective the manufacture of block copolymers and/or dispersions of particles in a matrix in which particles of one structure are evenly distributed within a medium comprising a polymer of another, more or less modified, polymer. Both batch and continuous processes for producing such composite products are found in the prior art.

The reader may also be interested in U.S. Pat. No. Shirai et al 3,642,951, Saito et al 4,066,718, Furutachi et al 4,128,606, and particularly Scoggin 3,525,781, which teaches preparing block copolymers continuously by feeding batch prepolymers into a continuous polymerization zone, Baba et al U.S. Pat. No. 4,433,110, which provides propylene and 1-butene polymerization in a first stage and propylene and ethylene polymerization in a second stage, and particularly Frese et al 3,959,409, which discloses the production of crystalline propylene/ethylene/butene-1 terpolymers in series-connected reactors, the ethylene being introduced only in the second or subsequent reactors. See also the large number of examples of terpolymer production in Suzuki et al U.S. Pat. No. 4,304,890. The feed of ethylene is increased, compared to propylene, after the first stage in Sennari et al U.S. Pat. No. 3,670,053.

We are not aware of any rationale in the prior art for utilizing 1-butene to facilitate the manufacture of low melting point polymers of propylene and a small amount of ethylene.

SUMMARY OF THE INVENTION

We have invented a two-stage polymerization process which employs three monomers in each stage, under carefully controlled concentration conditions, to produce a polymer having unique desirable properties. The two-stage process may be operated conveniently on a commercial scale by using two continuous reactors in series. The following examples demonstrating the process use, for convenience, the process equivalent of two reactors in series, namely a single batch reactor wherein the batch is treated in a first and a second stage. Concentrations of the termonomers are maintained in the first and second stages of the batch reactor at levels equivalent to those in two reactors in series operating continuously and at steady-state conditions.

In our process, high concentrations of propylene and 1-butene are maintained in the reaction zone throughout, but only low concentrations of the very reactive ethylene are maintained. The major distinguishing difference between stages is that the ethylene concentration is increased in the second stage to promote greater incorporation of ethylene into the terpolymer system, thereby lowering the melting point of the product of the two stages into the desirable low temperature range of 130° to 140° C.

Specifically, we propose a hexane slurry polymerization system where the first reactor is charged with hexane or other solvent for propylene, about one-half percent to about one percent of a titanium tetrachloride catalyst supported on magnesium chloride and about 2.5–3.0% of a solution of 10% triethylaluminum in hexane. Temperature is preferably maintained at about 35° C. and pressure is about 150 psig. The termonomer composition in the reactor to produce a product melting in the range of 130° to 140° C. is typically the following as determined by sampling the reactor gas cap and analyzing for the weight ratio of monomers by vapor-phase chromatography:

|  | First Stage | Second Stage |
| --- | --- | --- |
| ethylene | 1.2 | 3.4 |
| propylene | 93.9 | 90.5 |
| 1-butene | 4.9 | 6.1 |
|  | 100.0 | 100.0 |

In the second stage, the ethylene component of the termonomer mixture is maintained at a higher level than in the first stage by supplementing the liquid termonomer feed with ethylene typically in 3 psig increments. Product melt flows in the range of 5 to 55 are produced by maintaining levels of hydrogen in the reactor of 0.025 and 0.25 weight percent in stages 1 and 2, respectively, in the gas cap, by vapor-phase chromatography.

This process, with variations in the content of ethylene and 1-butene of plus or minus five percent and consequent possible variations in content of propylene, will produce a terpolymer having a DSC melting point of about 135° C., typically about 130° to 140° C., and containing about 3.1 weight percent ethylene and about 4.3 weight percent 1-butene. Our invention includes products recovered from the above process containing from about 3% to about 4% ethylene and about 3% to about 5.6% 1-butene and having a melting point between 130° and 140° C., according to the formula:

$$-5.0689(C_2) - 2.1135(C_4) + 161.56 = 130° \text{ to } 140° \text{ C.}$$

where $C_2$ and $C_4$ are the concentrations of ethylene and 1-butene in weight percent. We have found that our terpolymers having a melting point between 130° C. and 140° C. have excellent heat sealability. The product slurry is in the form of small particles dispersed in the hexane diluent. The size of the terpolymer particles is determined primarily by the size of the original catalyst particles. The terpolymer particles isolated from the reactor slurry have a size ranging from 200 to 2,000 microns diameter.

Within the above formula, we prefer to make terpolymer product having an ethylene content in the lower part of its range and a 1-butene content in the higher part of its range, in order to minimize the portion of product which is undesirable because it is soluble in hexane. Specifically, we prefer product made by controlling the gas cap concentrations of $C_2$ and $C_4$ at about 3.2 to 3.4% and 6.1 to 6.4%, respectively.

In the following examples, the reactor was loaded with hexane and catalyst components, and 1 psig was maintained in the reactor gas caps for one hour at 35° C. by feeding propylene. The catalyst used was a commercial Montedison FT1SS catalyst.

After loading the reactor with hexane and catalyst components, and optionally carrying out the pre-polymerization step, the initial reactor charge at 35° C. is carried out as indicated in the table of examples.

A stirred, jacketed reactor of 300 psig maximum operating pressure was used to make up and feed the termonomer mixtures to the polymerization reactor. 1-butene, propylene, and ethylene were charged in that order to give the liquid-phase feed composition indicated in the table of examples below. The termonomer mixture was then heated to 30° C. to raise its pressure above 150 psig so that it could be metered by way of a needle valve to the polymerization reactor, on demand, to maintain 150 psig.

The termonomer feed mixture of the compositions indicated in the table of examples was fed to the polymerization reactor, on demand, to maintain the "First Stage" gas cap composition shown above at 150 psig. Demand is manifested immediately when the reaction begins.

The second-stage was started by supplementing the termonomer feed with 3 psig incremental additions of ethylene to elevate the ethylene content of the reactor gas cap to 2–4 wt.% ethylene.

The more desirable products for our purposes are those of examples 12 and 13, having good or excellent processability with a melting point between 130° C. and 140° C., providing good heat sealability.

|  | Example No. | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| Pre-polymerization | yes | yes | yes | yes | yes | no | no | no | no | no | yes | yes | yes |
| Initial reactor charge at 35° C.: | | | | | | | | | | | | | |
| hydrogen, ΔP psig | 1.0 | 1.2 | 1.0 | 1.0 | 1.2 | 1.0 | 1.4 | 1.4 | 1.4 | 1.4 | 1.2 | 1.2 | 1.2 |
| 1-butene, lbs. | 4.7 | 4.6 | 6.9 | 9.2 | 4.0 | 3.0 | 3.8 | 4.8 | 5.5 | 5.0 | 6.9 | 6.9 | 6.9 |
| propylene, lbs. | 20 | 38 | 35 | 42 | 21 | 36 | 46 | 46 | 46 | 46 | 35 | 35 | 35 |
| ethylene, ΔP psig | — | — | — | — | — | 5 | 3 | 3 | 3 | 3 | — | — | — |
| Liquid termonomer feed: | | | | | | | | | | | | | |
| 1-butene, wt. % | 4.0 | 3.4 | 6.2 | 5.4 | 5.5 | 4.1 | 2.6 | 4.0 | 6.1 | 2.1 | 5.7 | 5.9 | 7.0 |
| propylene, wt. % | 93.4 | 94.3 | 91.4 | 92.0 | 90.2 | 91.9 | 93.0 | 91.5 | 90.0 | 93.6 | 91.8 | 92.0 | 90.5 |
| ethylene, wt. % | 2.6 | 2.3 | 2.4 | 2.6 | 4.3 | 4.0 | 4.4 | 4.5 | 3.9 | 4.3 | 2.5 | 2.1 | 2.5 |
| Product characterization: | | | | | | | | | | | | | |
| melting point, °C. | 138.0 | 146.7 | 142.1 | 140.6 | 130.2 | 138.9 | 142.7 | 134.4 | 138.5 | 135.0 | 140.4 | 135.5 | 133.8 |
| melt flow rate (ASTM D1238, condition L) | 2.2 | 9.4 | 5.7 | 3.3 | 1.9 | 3.5 | 3.5 | 4.1 | 8.4 | 4.0 | 9.3 | 5.6 | 5.5 |
| composition (by IR analysis), wt. %: | | | | | | | | | | | | | |
| 1-butene | 2.4 | 2.3 | 3.4 | 3.8 | 2.1 | 1.4 | 1.4 | 1.5 | 2.7 | 1.6 | 3.5 | 3.4 | 4.3 |
| ethylene | 3.1 | 2.3 | 2.5 | 3.3 | 5.9 | 4.0 | 3.4 | 4.1 | 3.2 | 5.4 | 2.4 | 3.5 | 3.1 |
| propylene (by difference) | 94.5 | 95.4 | 94.1 | 92.9 | 92.0 | 94.6 | 95.2 | 94.4 | 94.1 | 93.0 | 94.1 | 93.1 | 92.6 |
| Reactor slurry processability by solid-bowl centrifuge | poor | excel. | good | poor | poor | poor | poor | poor | poor | poor | good | good | excel. |

We claim:

1. Method of making a modified polypropylene in hexane slurry, said polypropylene having improved low-temperature thermal properties comprising (a) maintaining in a first stage under polymerizing conditions, including a pressure of about 140 psig to about 160 psig, a hexane-catalyst slurry in equilibrium with a gas phase composition comprising about 93.9% propylene, about 4.65% to about 5.15% 1-butene, and about 1.14% to about 1.26% ethylene, to form a dispersion in said slurry of terpolymer particles, and (b) then imposing on said slurry of terpolymer particles, under polymerizing conditions in a second stage, a concentration of ethylene in the gas phase increased to about 2% to about 4%, thereby forming a substrate terpolymer including about 3% to about 4% ethylene and about 3% to about 5.6% 1-butene, and recovering a polymer product having a melting point of about 130° C. to about 140° C.

2. Method of claim 1 wherein the concentrations of monomers in step (a) are maintained in the slurry by maintaining the reaction vessel at a pressure of from about 140 psig to about 160 psig.

3. Method of claim 1 wherein the second stage of the process is conducted in a reaction vessel different from the first stage.

4. Method of claim 1 wherein no 1-butene is fed to the second stage.

5. Method of claim 1 including the step of recovering a polymer product having a melting point of about 130° C. to about 140° C.

6. Method of claim 1 wherein the gas cap concentration of ethylene in the second step is maintained at about 3.23% to about 3.57%.

* * * * *